(12) United States Patent
Koito et al.

(10) Patent No.: US 8,786,571 B2
(45) Date of Patent: Jul. 22, 2014

(54) LIQUID CRYSTAL DISPLAY DEVICE AND A METHOD OF MANUFACTURING THE SAME

(75) Inventors: Takeo Koito, Kanagawa (JP); Koji Noguchi, Kanagawa (JP)

(73) Assignee: Japan Display West Inc., Aichi (JP)

( * ) Notice: Subject to any disclaimer, the term of this patent is extended or adjusted under 35 U.S.C. 154(b) by 472 days.

(21) Appl. No.: 12/534,265

(22) Filed: Aug. 3, 2009

(65) Prior Publication Data

US 2010/0033448 A1  Feb. 11, 2010

(30) Foreign Application Priority Data

Aug. 7, 2008  (JP) ................. 2008-204593

(51) Int. Cl.
*G06F 3/045* (2006.01)
*G02F 1/1333* (2006.01)
*G06F 3/041* (2006.01)

(52) U.S. Cl.
CPC .......... *G02F 1/13338* (2013.01); *G06F 3/0412* (2013.01)
USPC ........................................ 345/174; 345/173

(58) Field of Classification Search
USPC .................................. 345/173–178
See application file for complete search history.

(56) References Cited

U.S. PATENT DOCUMENTS

| 6,501,529 | B1* | 12/2002 | Kurihara et al. | 349/160 |
|---|---|---|---|---|
| 8,355,108 | B2* | 1/2013 | Koito et al. | 349/155 |
| 8,400,411 | B2* | 3/2013 | Sasaki et al. | 345/173 |
| 2006/0017710 | A1* | 1/2006 | Lee et al. | 345/173 |
| 2007/0279330 | A1* | 12/2007 | Ryu et al. | 345/67 |
| 2008/0122804 | A1 | 5/2008 | Kinoshita | |
| 2008/0180615 | A1* | 7/2008 | Haruyama | 349/114 |
| 2008/0186434 | A1* | 8/2008 | Yun et al. | 349/106 |
| 2009/0135158 | A1* | 5/2009 | Takahashi et al. | 345/174 |
| 2009/0237365 | A1* | 9/2009 | Choi et al. | 345/173 |
| 2009/0256816 | A1* | 10/2009 | Kim | 345/174 |

FOREIGN PATENT DOCUMENTS

| JP | 2001-075074 | 3/2001 |
|---|---|---|
| JP | 2007-052368 | 3/2007 |
| JP | 2008-134293 | 6/2008 |

OTHER PUBLICATIONS

Japanese Patent Office; Office Action dated Jan. 14, 2014 for Application No. 2008-204593.

* cited by examiner

*Primary Examiner* — Christopher E Leiby
(74) *Attorney, Agent, or Firm* — Dentons US LLP

(57) ABSTRACT

A liquid crystal display device includes a first substrate on a display surface side; a second substrate on a back surface side; a liquid crystal layer formed between the first and second substrates; an alignment film formed on one of the first and second substrates so as to contact the liquid crystal layer; a first sensor electrode formed on a surface, of the alignment film, contacting the liquid crystal layer; and a second sensor electrode formed on the other of the first and second substrates, and adapted to either contact or approach the first sensor electrode when the first substrate is pressed from the display surface side.

13 Claims, 15 Drawing Sheets

FIG. 6A V_gate
FIG. 6B V_sig
FIG. 6C V_com
FIG. 6D Write
FIG. 6E Read

T1 T2 T3 T4

SENSOR OFF ----------
SENSOR ON ⎯⎯⎯⎯⎯

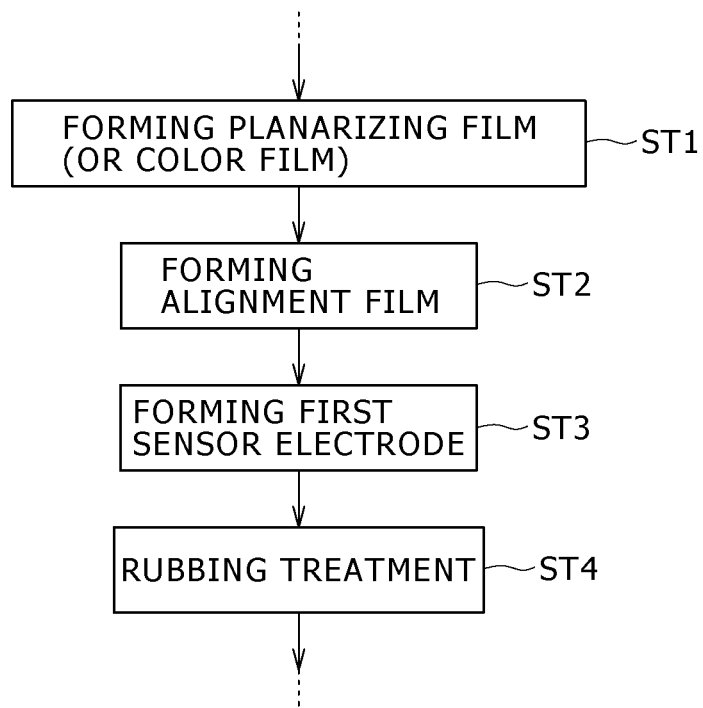

FIG.9A
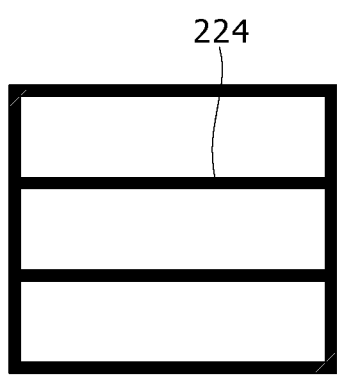
FIG.9B
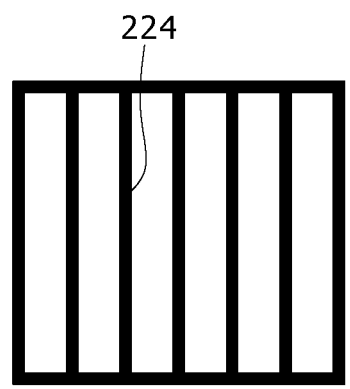
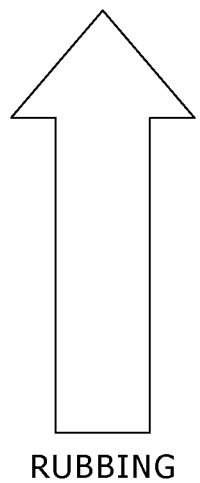
RUBBING

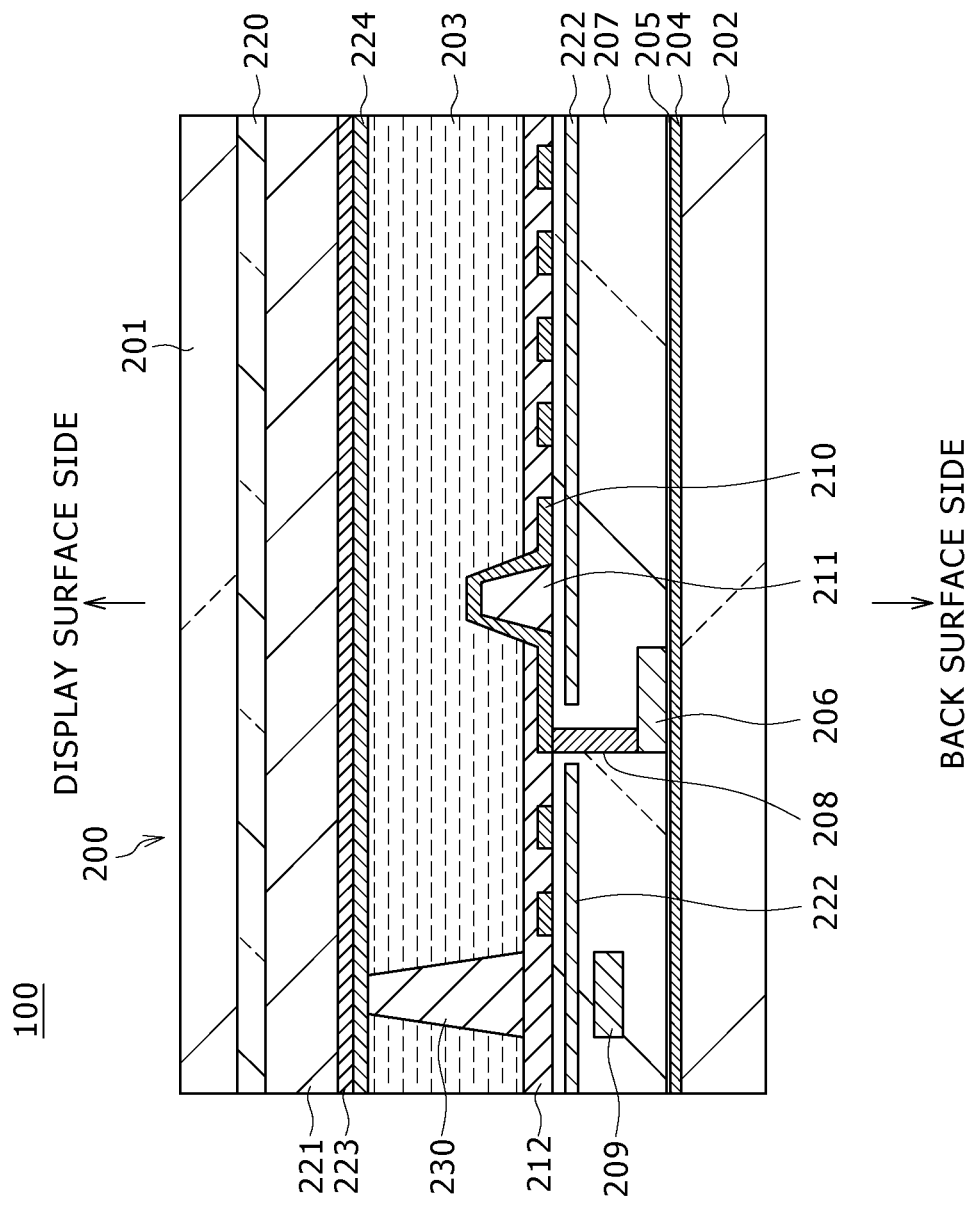

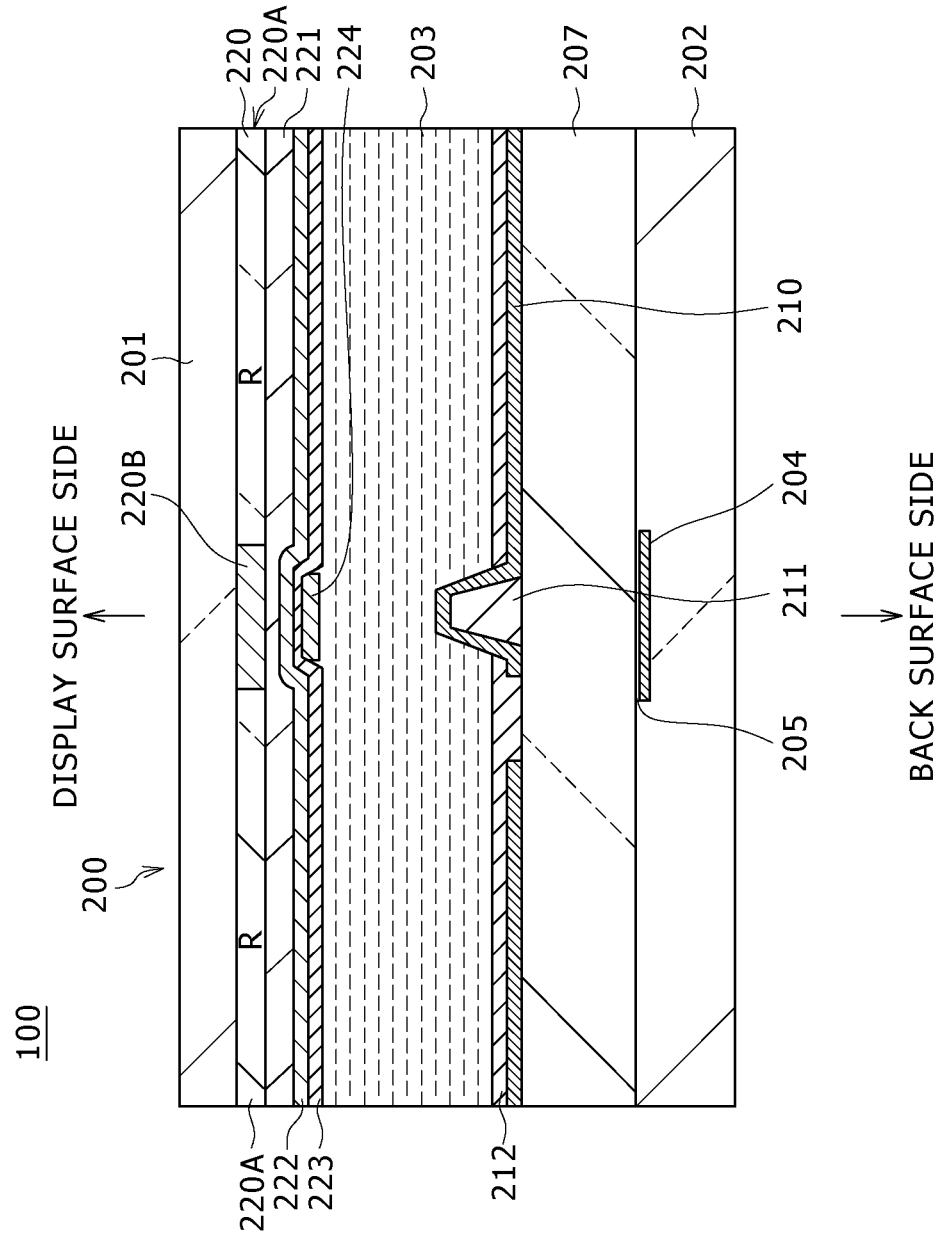

LIQUID CRYSTAL DISPLAY DEVICE AND A METHOD OF MANUFACTURING THE SAME

BACKGROUND OF THE INVENTION

1. Field of the Invention

The present invention relates to a liquid crystal display device, having a touch sensor function, in which one of two sensor electrodes is disposed across a liquid crystal enclosed between first and second substrates from the other thereof, and a method of manufacturing the same.

2. Description of the Related Art

A liquid crystal display device has advantages such as thinning, weight saving, and low power consumption. For this reason, the liquid crystal display device is applied to a large number of electronic apparatuses for mobile applications such as a mobile phone and a digital camera.

The liquid crystal display device has a liquid crystal panel in which a liquid crystal is enclosed between a pair of substrates. In the liquid crystal display device, a light radiated from a planar surface light source such as a backlight provided on a back surface of the liquid crystal panel is modulated by the liquid crystal panel. Also, the display of an image is carried out on a front surface (a side of viewing a display surface) of the liquid crystal panel by the modulated light.

In recent years, a liquid crystal display device having a sensor function called "a touch panel" with which data representing contents instructed by a user is directly inputted by utilizing an icon or the like displayed on a screen of the liquid crystal display device has been realized.

The touch panel is installed on the display surface side of the liquid crystal display device so that the instructed contents shown on the screen of the liquid crystal display device can be selected with a hand of a human being or an object (for example, a stylus pen). When the hand of the human being or the object directly touches the touch panel, the touch panel detects a position within the panel surface which the hand of the human being or the object touches. The liquid crystal display device receives the instructed contents in the form of an input signal in accordance with the position where the contact is detected, and carries out an operation based on the input signal.

When the liquid crystal display device including the touch panel is used in a computer or the like, there is no need for providing an input unit as an attached accessory, outside a main body and a display device, such as a keyboard or a mouse. Alternatively, the touch panel provides another input unit which assists such an input unit. In addition, when the touch panel is used in a mobile product such as a mobile phone, there is no need for providing an input unit such as a keypad, or the number of keys is reduced.

From the above, when the touch panel is mounted to the liquid crystal display device, the number of special attached accessories is reduced. For the product provider side, when the number of attached accessories is less, there is provided an advantage that the degree of freedom of the product design increases, and thus the miniaturization and the convenience enhancement are progressed, thereby increasing the product power. This provides the advantages such as the price-reduction, high functionality and convenience enhancement of the product for the user side as well. For this reason, the use of the touch panel has a tendency to increase yearly.

A liquid crystal display device in which a touch panel is added to a display surface side of a liquid crystal display panel is known in terms of a method of mounting the touch panel.

However, it is disadvantageous to the thinning of the display device that the touch panel is externally added, which becomes a primary factor of an increase in manufacturing cost. In addition, in the liquid crystal display device to which the touch panel is externally added, the optical characteristics in a phase of image display changes due to an influence of a refractive interface, so that the visibility of the image is reduced. For this reason, it is studied that the liquid crystal display panel and the touch panel are formed integrally with each other.

A resistance film system, an electrostatic capacitance system, and an optical system are known as a detection system in the touch panel. Of these systems, in the touch panel utilizing the resistance film system, one point detection is a principle. Thus, the use of the application of the touch panel utilizing the resistance film system is limited.

It is studied in the systems to form the liquid crystal display panel and the touch panel integrally with each other.

In particular, when the liquid crystal display panel and the touch panel are formed integrally with each other in the resistance film system, a pixel array drive wiring for display can be effectively used as a wiring as well for detection of a change in resistance. Therefore, the resolution for display is prevented from being reduced, and the precision of position detection by a sensor is high. Also, an additional function such as a multi-point detecting function can be obtained.

There is known a liquid crystal display device, with a touch sensor, in which paired electrodes (hereinafter referred to as either "first and second sensor electrodes" or "touch electrodes") which contact each other when the user presses a panel surface with his/her finger or the like are formed on two substrates, respectively, through which a liquid crystal layer is sandwiched for the purpose of forming the liquid crystal display panel and the touch panel integrally with each other in the resistance film system. This liquid crystal display device, for example, is described in Japanese Patent Laid-open No. 2001-75074.

In the liquid crystal display device having the touch sensor function utilizing the resistance film system and having the structure as described above, the two sensor electrodes need to be formed contactably each other so as to hold the liquid crystal layer between the two sensor electrodes.

In general, however, the liquid crystal layer is located so as to contact an alignment film for determining an alignment direction of a liquid crystal molecule. For this reason, in order to apply the structure described above, the first and second sensor electrodes are obliged to contact the alignment film with the alignment film being held between the first and second sensor electrodes. For this reason, since a part of the alignment film which the first and second sensor electrodes contact is shaved, and as a result, there is a possibility that the imperfect alignment is caused, or the alignment film shaved floats in the liquid crystal to cause the imperfect display. Therefore, in the liquid crystal display device, utilizing the resistance film system, having such a structure, it is feared from the reason described above that the display grade can not be maintained by repetitively using the touch sensor.

There is known a liquid crystal display devices, having the touch sensor function utilizing the resistance film system, in which in order to avoid such inconvenience, a portion of an alignment film which sensor electrodes contact is removed. This liquid crystal display devices, for example, is described in Japanese Patent Laid-open No. 2007-52368.

SUMMARY OF THE INVENTION

Japanese Patent Laid-open No. 2007-52368 discloses the technique with which during the manufacture of the liquid crystal display device having the touch sensor function and utilizing the resistance film system, a solvent is locally applied from a minute nozzle used in ink jet to the alignment film to dissolve the local portion of the alignment film, thereby exposing a surface of the touch electrode.

However, in the case of adoption of such a process, the throughput is estimated to be low, and thus the manufacturing cost increases. In addition, it is difficult to perfectly, locally remove the alignment film deposited once, and thus reduction of the yield is feared. Also, the application of the ink jet technique means that it is necessary to invest in normal equipment. Thus, the manufacturing cost increases in terms of this respect.

Moreover, with the technique for locally applying the solvent, it is feared to suppose that the alignment film is partially dissolved even in the circumference of the touch electrode the surface of which is desired to be exposed. Thus, since a margin is required in terms of an area so as to prevent the removal of the alignment film from exerting an influence on the display, an extra area other than the area substantially contributing to the display increases within a pixel. This, for example, gives the same disadvantage as that in the case where an aperture ratio (a rate at which a light transmitting portion occupies a pixel area) in a transmission type liquid crystal display device is reduced. For this reason, an increase in area margin due to the removal of the alignment film results in the high possibility that the disadvantage of the reduction of a luminance of the picture is provided.

The present invention has been made in the light of the circumstances described above, and it is therefore desirable to provide a highly reliable liquid crystal display device which requires no process resulting in an increase in manufacturing cost, which has a high sensitivity, and with which a touch sensor function utilizing a resistance film system is provided integrally so as not to exert an influence on a display performance, and a method of manufacturing the same.

In order to attain the desire described above, according to an embodiment of the present invention, there is provided a liquid crystal display device including: a first substrate on a display surface side; a second substrate on a back surface side; a liquid crystal layer formed between the first and second substrates; an alignment film formed on one of the first and second substrates so as to contact the liquid crystal layer; a first sensor electrode formed on a surface, of the alignment film, contacting the liquid crystal layer; and a second sensor electrode formed on the other of the first and second substrates, and adapted to either contact or approach the first sensor electrode when the first substrate is pressed from the display surface side.

With the structure described above, the first sensor electrode is formed on one of the first and second substrates through the alignment film. The alignment film is a base film for the first electrode, and thus the surface of the first sensor electrode is not covered with the alignment film. In addition, the second sensor electrode is disposed in the position, where the second sensor electrode faces the first sensor electrode with the liquid crystal layer being held between the first and second electrodes, on the side of the other of the first and second electrodes.

When one of the first and second electrodes on the display surface side is pressed in this state, the one of the first and second electrodes is bent by application of an external pressure. When the one of the first and second electrodes is bent by application of the external pressure, the first sensor electrode contacts the second sensor electrode, and as a result, a potential of at least one of the first and second sensor electrodes changes from that before the contact. Or, since the first sensor electrode approaches the second sensor electrode although the first sensor electrode does not come to contact the second sensor electrode, an electrical change, for example, a capacitance change occurs between the first sensor electrode and the second sensor electrode. Such an electrical change is drawn to the outside to be detected, or is detected by a built-in detecting section, whereby the position where the one of the first and second substrates is pressed is detected.

With regard to the more detailed structure, it is possible to adopt a structure in which the second sensor electrode is also used as a pixel electrode (first structure), the case where detection areas different from pixels are disposed in accordance with a predetermined rule (second structure), and the case where the second sensor electrode different from the pixel electrode is disposed within the pixel (third structure). Also, it is possible to adopt the case where the first sensor electrode and the second sensor electrode are formed lengthwise in directions perpendicularly intersecting with each other in long patterns common to a plurality of pixels, and a resistance change due to the contact is read out (fourth structure).

According to another embodiment of the present invention, there is provided a method of manufacturing a liquid crystal display device including: a first step of forming a predetermined functional film on a first substrate; a second step of forming a predetermined functional film on a second substrate; and a third step of disposing the first substrate and the second substrates on a display surface side and on a back surface side, respectively, to fix the first substrate and the second substrates to a panel frame, and injecting a liquid crystal between the first substrate and the second substrates to seal the liquid crystal between the first substrate and the second substrates. The second step includes the step of forming a second sensor electrode on a partial area of the second substrate. The first step includes the steps of: forming an alignment film on the first substrate; forming a first sensor electrode on a partial area on the alignment film in a position where the first sensor electrode faces the second sensor electrode through a layer of the liquid crystal formed in the third step; and rubbing the alignment film in one direction in a state in which the first sensor electrode is formed.

According to the present invention, it is possible to provide the highly reliable liquid crystal display device which requires no process resulting in the increase in manufacturing cost, which has a high sensitivity, and with which the touch sensor function utilizing the resistance film system is provided integrally so as not to exert the influence on the display performance, and the method of manufacturing the same.

BRIEF DESCRIPTION OF THE DRAWINGS

FIGS. 6A to 6E are respectively timing charts showing waveforms of voltages of wirings and various signals;

FIG. 8 is a flow chart explaining a characteristic portion of a method of manufacturing the transmission type liquid crystal device according to the first embodiment of the present invention;

FIGS. 9A and 9B are top plan views explaining a preferred relationship between a rubbing direction and a sensor electrode pattern;

FIG. 10 is a schematic cross sectional view showing a structure of a transmission type liquid crystal display device according to a second embodiment of the present invention;

FIG. 11 is a schematic cross sectional view showing a structure of a transmission type liquid crystal display device having a recess portion formed therein according to Change 3, and corresponding to FIG. 2;

DETAILED DESCRIPTION OF THE PREFERRED EMBODIMENTS

The preferred embodiments of the present invention will be described in detail hereinafter with reference to the accompanying drawings. Here, the present invention is applied to a transmission type liquid crystal display device.

First Embodiment

Figure 1:
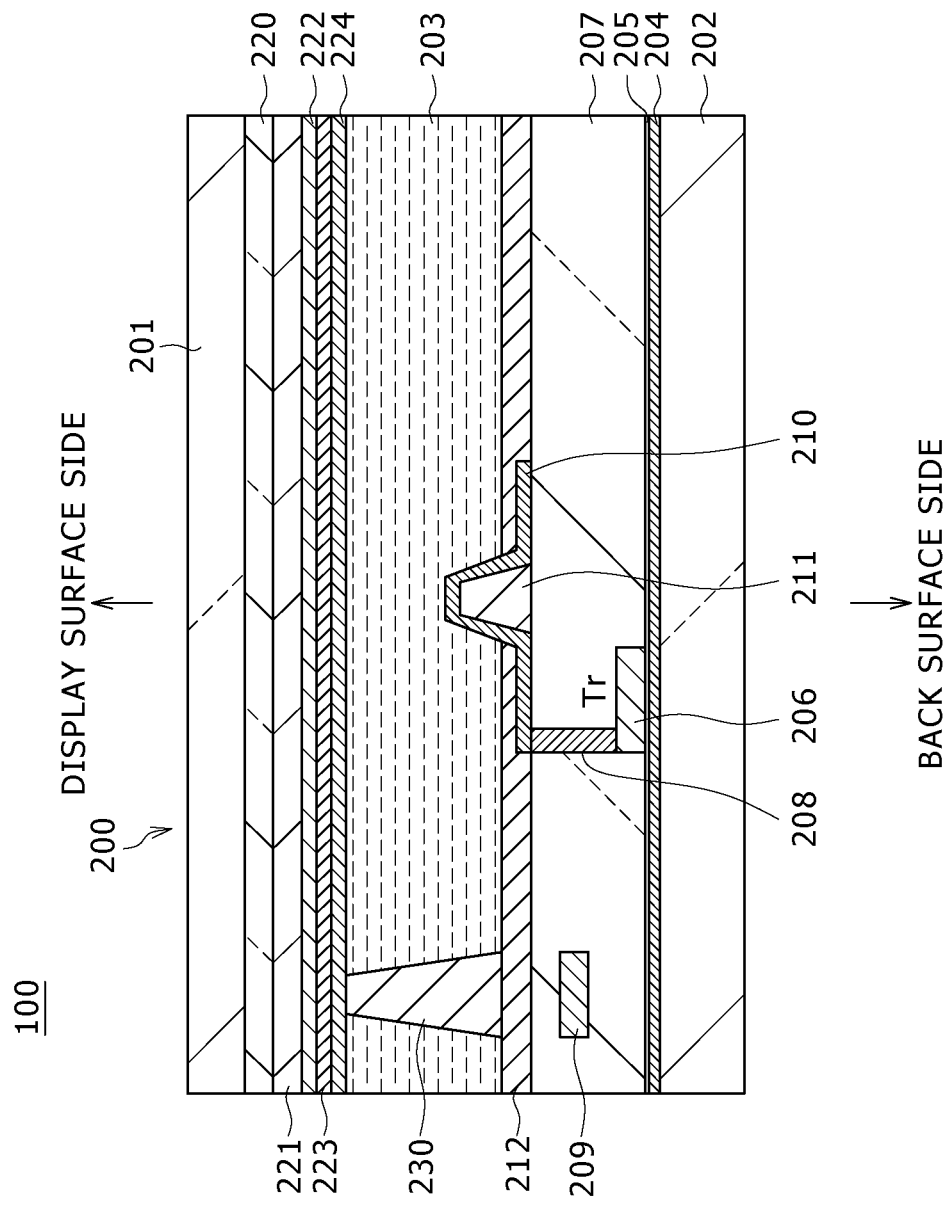
FIG. 1 is a schematic cross sectional view, showing a structure of a transmission type liquid crystal display device according to a first embodiment of the present invention, taken along line A-A of FIG. 3.
Figure 2:
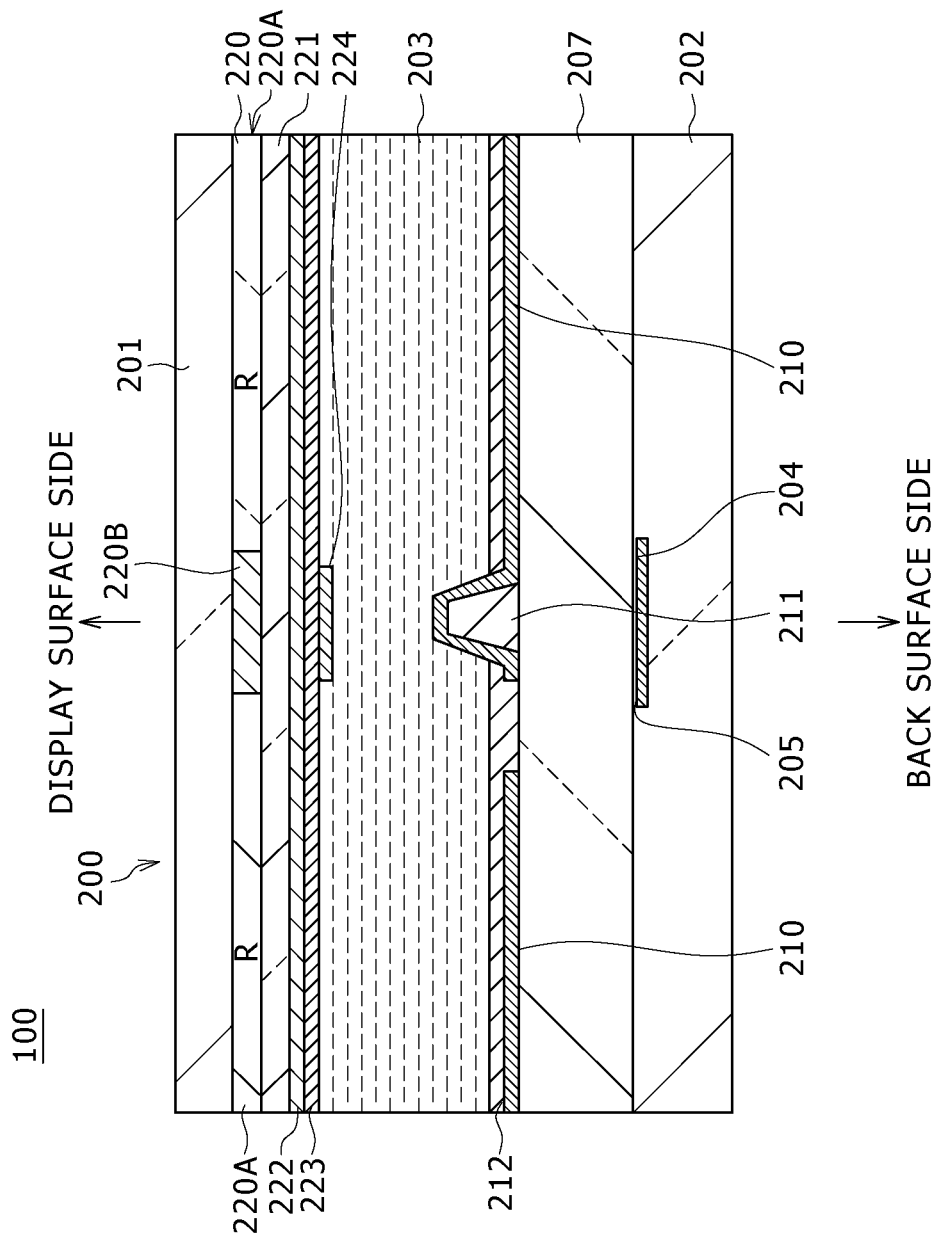
FIG. 2 is another schematic cross sectional view, showing a structure of the transmission type liquid crystal display device according to the first embodiment of the present invention, taken along line B-B of FIG. 3.
Figure 3:
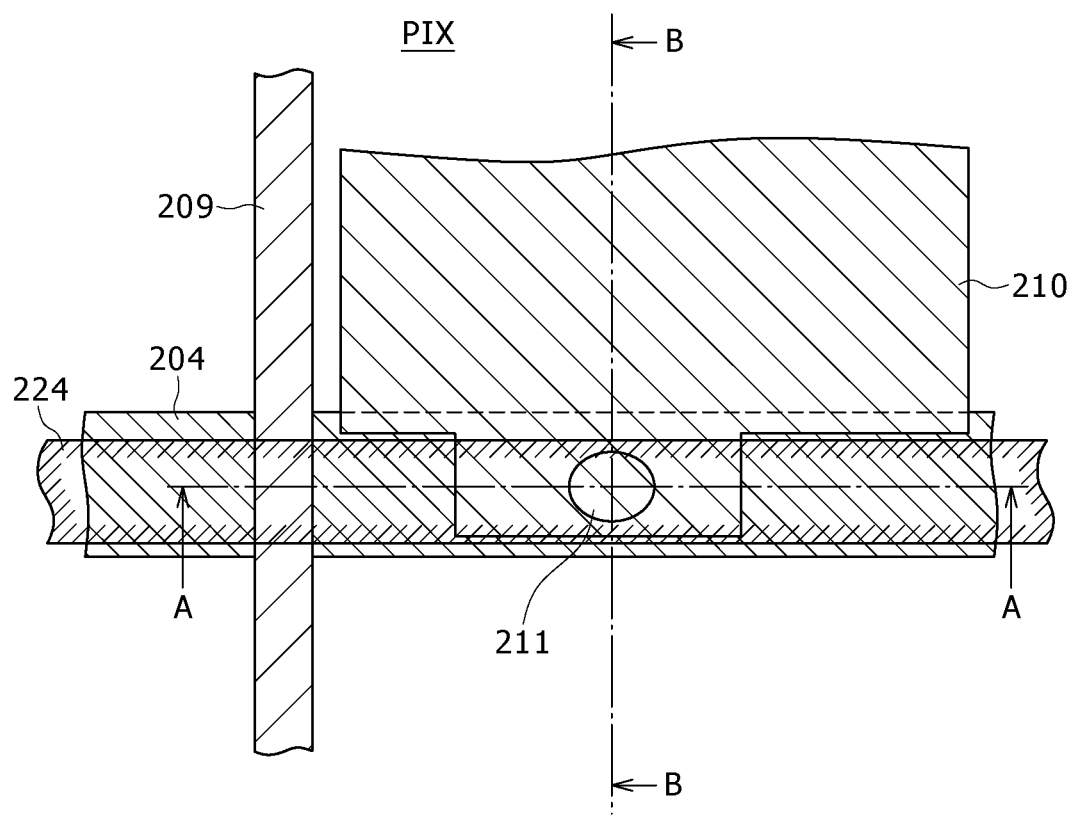
FIG. 3 is a schematic top plan view showing a part of a pixel included in the transmission type liquid crystal display device of the first embodiment.

FIG. 1 is a schematic cross sectional view, showing a structure of a transmission type liquid crystal display device according to a first embodiment of the present invention, virtually taken along line A-A of FIG. 3, and FIG. 2 is another schematic cross sectional view, showing a structure of the transmission type liquid crystal display device according to the first embodiment of the present invention, virtually taken along line B-B of FIG. 3. Also, FIG. 3 is a schematic top plan view showing a part of a pixel which the transmission type liquid crystal display device of the first embodiment has.

The liquid crystal display device 100 illustrated in FIGS. 1 and 2 has a liquid crystal panel 200, a backlight (not shown), and a drive portion (not shown) for driving the liquid crystal panel 200 and the backlight.

In the liquid crystal panel 200 shown in FIGS. 1 and 2, an upper side in each of FIGS. 1 and 2 corresponds to "a display surface side," and a lower side in each of FIGS. 1 and 2 corresponds to "a back surface side." The backlight is disposed on the back surface side so as to be close to the liquid crystal panel 200.

In the liquid crystal panel 200, a color filter substrate 201 as "a first substrate on the display surface side," and a TFT array substrate 202 as "a second substrate on the back surface side" face at a distance each other. The TFT array substrate 202 is called "a drive substrate" as well, and the color filter substrate 201 is called "a counter substrate" as well.

Although details will be described later, pixel electrodes, wirings and transistors are respectively disposed in a matrix on the TFT array substrate 202. As a result, when, for example, viewed from the display surface side of the liquid crystal panel 200, a plurality of pixels PIX are disposed in a matrix. The pixel is a minimum unit at which a gradation can change.

As shown in FIGS. 1 and 2, a liquid crystal layer 203 is formed so as to be held between the color filter substrate 201 and the TFT array substrate 202.

Although details will be described later, after predetermined functional layers are laminated and formed on the color filter substrate 201 and the TFT array substrate 202, respectively, the two sheets of color filter substrate 201 and TFT array substrate 202 are disposed so as to face each other, and a liquid crystal is injected and sealed between the color filter substrate 201 and the TFT array substrate 202, thereby forming the liquid crystal layer 203.

The TFT array substrate 202 is made of a material, such as a glass, having a high degree of transparency, and a gate electrode 204 of a transistor Tr is formed on the TFT array substrate 202. A TFT layer 206 becoming a body area of the transistor Tr is formed on the gate electrode 204 through a thin gate insulating film 205. Referring to FIGS. 1 and 2, the gate electrode 204 is directly formed on the TFT array substrate 202. However, the gate electrode 204 may be formed on an insulating layer. In addition, although details are omitted in its illustration, an impurity is implanted into the TFT layer 206, thereby forming a source region and a drain region.

It is to be noted that the gate electrode 204 is lengthwise wired along the cross section shown in FIG. 1 to be used as scanning lines as well. Since the gate electrode 204 is made of a high-melting point metallic material such as molybdenum, when a wiring resistance of the gate electrode 204 is desired to be reduced, the gate electrode 204 is suitably connected to a wiring of an upper layer (not shown).

A multi-layer insulating film 207 is formed above the TFT array substrate 202 so as to burry therein the transistor Tr thus formed.

A conductive layer such as a plug 208 of the transistor Tr, and a signal line 209 formed from a metallic wiring made of aluminum or the like are buried in the multi-layer insulating film 207. As shown in FIG. 3, the signal line 209 is lengthwise wired in a direction perpendicularly intersecting with the gate electrode (scanning line) 204.

A pixel electrode 210 serving as "a second sensor electrode" as well is formed above a planarizing film 205 so as to be connected to the plug 208. The pixel electrode 210 is made of a transparent electrode material.

The liquid crystal display device 100 of the first embodiment is a liquid crystal display device having "a VA ECB mode." For this reason, as shown in FIG. 3, the pixel electrode 210 is disposed as one sheet of electrode having a large area over approximately the entire area of the pixel PIX. Both the pixel electrode 210 made of a transparent material, and an area, in the periphery of the pixel electrode 210, having no member for blocking a light are called "a light transmitting area." Also, both the wirings of the gate electrode 204 and the signal line 209, and an area in which the transmission of the light is blocked by the transistor Tr and the like are called "a light blocking area."

The pixel electrode 210 is an electrode through which an electric field is applied to the liquid crystal layer 203 every pixel. A pixel gradation is determined in accordance with a potential (display pixel potential) of the pixel electrode 210 in a phase of application of the electric field. Thus, a video signal is supplied from the signal line 209 for the purpose of giving the display pixel potential, and a predetermined potential of the video signal is sampled by the transistor Tr.

As will be described later, the other electrode through which the electric field is applied to the liquid crystal layer 203 every pixel is formed on the side of the color filter substrate 201.

A height adjusting layer 211 is formed under a part of the pixel electrode 210, and a second alignment film 212 as "the alignment film on the other substrate side" is previously formed over the pixel electrode 210. Details of the height adjusting layer 211 and the second alignment film 212 will be described later.

A plurality of functional films are laminated on the surface, on the liquid crystal layer 203 side, of the color filter substrate 201.

More specifically, the color filter substrate 201 is made of a material, such as a glass, having a high degree of transparency, and the color filter layer 220 is formed on the color filter substrate 201. As can be seen when viewing a cross section of FIG. 2, the color filter layer 220 has a filter area 220A dyed with a predetermined color such as red (R). With regard to the color of the filter area 220A, one pixel is designated with one color, and the color arrangement for the pixels is determined in accordance with a predetermined pattern. For example, the arrangement of the three colors of red (R), green (G) and blue (B) is set as one unit, and this color arrangement is repeated in a matrix.

Sometimes a non-filter area 220B is provided between the filter areas, and otherwise the non-filter area 220B is not provided between the filter areas. In FIG. 2, the non-filter area 220B is provided between the filter areas. The non-filter area 220B may be provided in the form of a black matrix area for light blocking, or a structure in which the color filter is locally removed for the purpose of forming a stepped portion as in the case of other embodiments which will be described later may be adopted for the non-filter area 220B.

The planarizing film 221 is formed on the color filter layer 220, and a common electrode 222 referred to as "a counter electrode" as well is formed on the planarizing film 221. The common electrode 222 is made of a transparent electrode material, and is formed as one sheet of blanket electrode common to a plurality of pixels, for example, all the pixels of an effective pixel area.

A first alignment film 223 is formed on the common electrode 222.

In the first embodiment, a sensor electrode 224 as "a first sensor electrode" is formed on the first alignment film 223. Formation of the sensor electrode 224 as "the first sensor electrode" on the first alignment film 223 is one of the large features in the first embodiment of the present invention.

When viewed from the entire effective pixel area, the sensor electrode 224 is formed in a lattice in a parallel strap, or in a rectangular shape.

In particular, the sensor electrode 224 is preferably formed in the parallel strap shape or rectangular shape. In this case, more preferably, the longitudinal direction of the rectangular shape or line-like shape is made to approximately agree with the direction of rubbing of the first alignment film 223. A relationship between the rubbing and the electrode pattern will be described in detail later.

The sensor electrode 224 is formed on the first alignment film 223, and its surface (a surface facing the liquid crystal layer 203) faces the pixel electrode 210.

Therefore, when the color filter substrate 201 is pressed by application of an external force, the sensor electrode 224 contacts the pixel electrode 210, so that the touch sensor detects the pressed position in the color filter substrate 201.

It should be noted that since a spacer 230 for supporting the liquid crystal layer 203 in a thickness direction is disposed every pixel, even when the external force is applied to the color filter substrate 201, the liquid crystal layer 203 is deformed merely to a certain extent. A layout position and a size (strength) of the spacer 230 are suitably determined so that the liquid crystal layer 203 is most largely deformed in the contact portion between the sensor electrode 224 and the pixel electrode 210 (the color filter substrate 201 is bent).

Here, the height adjusting layer 211 is previously formed in a base for formation of the pixel electrode 210. Although the height adjusting layer 211 may be formed in any planar shape, for example, as shown in FIG. 3, the height adjusting layer 211 is formed so as to have an elliptical isolated pattern. The purpose of providing the height adjusting layer 211 is that the contact between the pixel electrode 210 and the sensor electrode 224 is made satisfactory, and the second alignment film 212 is prevented from being formed in the contact portion of the pixel electrode 210 with the sensor electrode 224. The height adjusting layer 211 has such a height as to prevent the second alignment film 212 from being formed on a pixel electrode 210 portion on the height adjusting layer 211. Here, the word "height" means a size in a thickness direction of the liquid crystal layer 203. Although depending on the process as well, the height of the height adjusting layer 211 is preferably set as being equal to or longer than 2 μm. In addition, since when being provided in the light transmitting area, the height adjusting layer 211 becomes an obstacle to the light transmission, preferably, the height adjusting layer 211 is provided in the light blocking portion (a light blocking area over which, for example, the black matrix and the wiring cast a shadow). Although in FIG. 3, the height adjusting layer 211 is formed in a portion over which the gate electrode casts a shadow, the height adjusting layer 211 may be formed in an area or the like over which, for example, the signal line 209 casts a shadow.

Note that, it is allowed that the second alignment film 212 is thinly formed on the pixel electrode 210 portion located on a protrusion end face of the height adjusting layer 211 depending on the height of the height adjusting layer 211 in some cases. That is to say, the formation of the thin second alignment film 212 is allowed as long as the second alignment film 212 is thinly formed to the extent that no influence is exerted on the contact between the pixel electrode 210 and the sensor electrode 224. The height of the height adjusting layer 211 may be reduced to the extent that such a thin second alignment film 212 is formed on the pixel electrode 210 portion located on the protrusion end face of the height adjusting layer 211. However, the formation of such a thick second alignment film 212 that an influence is exerted on the contact is not allowed because it impairs the drift of providing the height adjusting layer 211.

Figure 4:
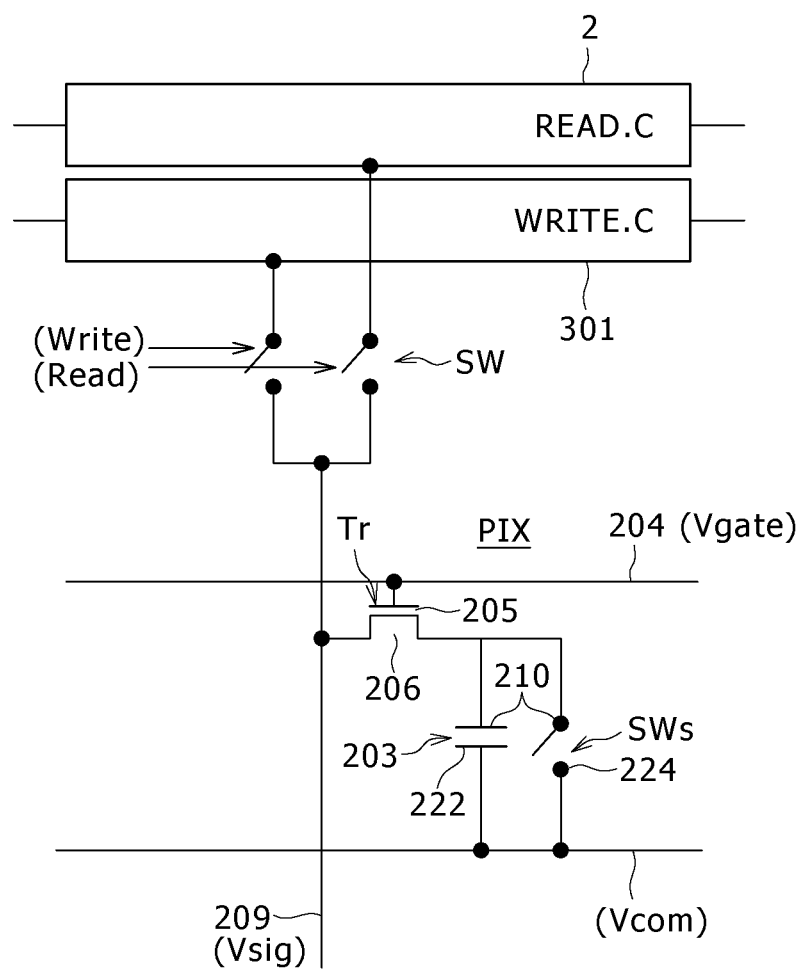
FIG. 4 is a circuit diagram, partly in block, showing an equivalent circuit of the pixel in the first embodiment together with a circuit for touch detection, and a circuit for data write.

FIG. 4 shows an equivalent circuit of the pixel together with a circuit for touch detection, and a circuit for data write.

In the equivalent circuit PIX illustrated in FIG. 4, the same constituent elements as those previously described with reference to FIGS. 1 to 3 are designated by the same reference numerals, respectively.

Here, one electrode of a capacitor having the liquid crystal layer 203 as a capacitor dielectric is formed from the pixel electrode 210, and the other electrode thereof is formed from the common electrode 222.

Figure 5:
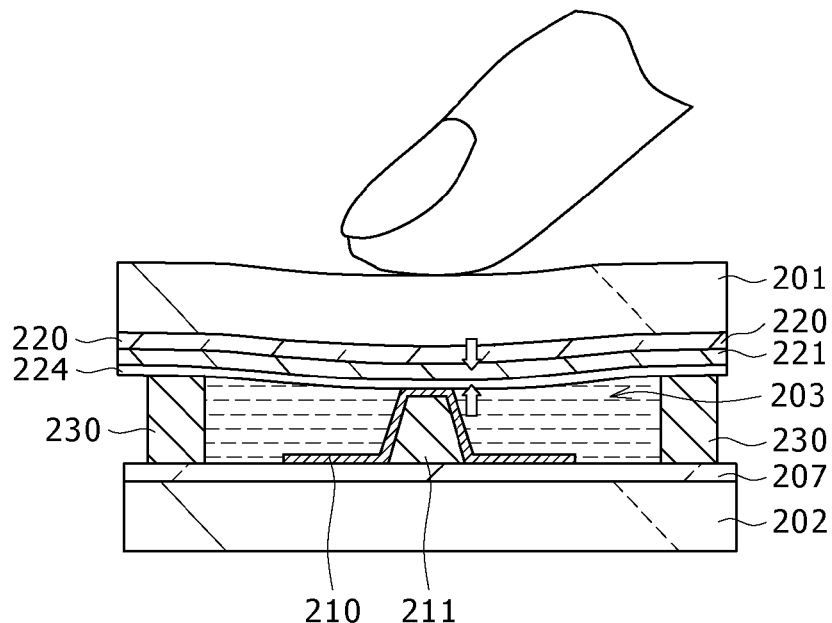
FIG. 5 is a cross sectional view schematically showing a situation in which first and second electrodes touch each other when a color filter substrate is pressed with a finger.

A sensor switch SWs is formed in parallel with the capacitor in the equivalent circuit. The sensor switch SWs is a two-terminal switch having no control terminal. The sensor switch SWs is turned ON by application of a pressure generated when the color filter substrate 201 is externally pressed with a finger or the like as shown in FIG. 5. On the other hand, when the pressure is released, the sensor switch SWs returns back to an OFF state. One electrode of the sensor switch SWs is formed from the pixel electrode 210, and the other electrode thereof is formed from the sensor electrode 224.

One of a source terminal and a drain terminal of the transistor Tr is connected to the pixel electrode 210, the other thereof is connected to the signal line 209.

A gate terminal of the transistor Tr is connected to the gate electrode 204. A gate voltage $V_{gate}$ is supplied from a scanning circuit such as a vertical driver (not shown) to the gate terminal of the transistor Tr through the gate electrode 204. The transistor Tr is controlled in accordance with a potential of the gate voltage $V_{gate}$.

Each of the common electrode 222 and the sensor electrode 224 is connected to a supply line ($V_{com}$ wiring) having a common voltage $V_{com}$ set therein.

A write circuit (WRITE.C) 301 is normally, directly connected as one constituent circuit within the drive portion to the signal line 209.

In the first embodiment, a read circuit (READ.C) 2 is provided as one constituent circuit within "the contact detecting portion" together with the write circuit 301 in the signal line 209. Although the read circuit 2 and the write circuit 301 may be controlled in connection thereof by switch SW which differentially operates (meaning that a write side and a read side are not simultaneously turned ON), the switch SW may not be provided. The reason for this is because when the pressing of the switch is allowed for a user, a predetermined picture representing what instruction (meaning) the pressing of the switch corresponds to is displayed on the screen in accordance with the running application software, and a display time period is long to a certain extent. Also, the reason for this is because even when the screen is pressed during the display based on the data temporarily written, so that the sensor switch SWs is turned ON to fix the potential of the signal line 209, for example, to the common voltage $V_{com}$, the same picture display state is obtained as soon as the pressing is released, and thus the picture display automatically returns back to the state before the pressing.

FIGS. 6A to 6E respectively show waveform charts of pulses applied in the phase of the contact detection, and voltages of the signal lines and the like. The contact detection shown in FIGS. 6A to 6E is an example of the case where as shown in FIG. 4, the switch SW is controlled in accordance with a working control signals. FIG. 6A is a waveform chart of the gate voltage $V_{gate}$ of the transistor Tr. FIG. 6B is a waveform chart of the signal voltage $V_{sig}$ of the signal line 209. FIG. 6C is a waveform chart of the common voltage $V_{com}$. FIG. 6D is a waveform chart of a control signal (Write) applied to the write side of the switch SW. FIG. 6E is a waveform chart of a control signal (Read) applied to the read side of the switch SW. Hereinafter, the control signal (Write) will be called "the write signal (Write)," and the control signal (Read) will be called "the read signal (Read)."

Before time T1 (in an initial state), the gate voltage $V_{gate}$, the signal voltage $V_{sig}$ and the common voltage $V_{com}$, the write signal (Write) and the read signal (Read) are all at the low level.

At the time T1, as shown in FIG. 6D, the write signal (Write) becomes a high level, and the signal voltage $V_{sig}$ is supplied to the signal line 209 by the write circuit 301 shown in FIG. 4.

At time T2, as shown in FIG. 6A, the gate voltage $V_{gate}$ is activated at the high level. At this time or before the time T2, as shown in FIG. 6D, the write signal (Write) becomes the low level. For this reason, the write side of the switch SW is closed, so that the signal line 209 becomes a floating state. For this reason, when the gate voltage $V_{gate}$ becomes the high level at the time T2 to turn ON the transistor Tr, a discharge path for the electric charges corresponding to the signal voltage $V_{sig}$ is formed.

It is assumed that at the time point of the time T2, the touch sensor is in an ON state, that is, the pixel electrode 210 contacts the sensor electrode 224 as shown in FIG. 5. In this case, since the electric charges of the signal line 209 in the floating state are discharged to the $V_{com}$ wiring having a very large capacitance, as indicated in FIG. 6B by a solid line, the signal voltage $V_{sig}$ is largely reduced.

On the other hand, in the case where the touch sensor is in an OFF state at the time T2, even when an amount of electric charges of the signal line 209 is reduced, the amount of electric charges of the signal line 209 is used to charge only the capacitor of the relatively small pixel electrode 210 or the like. For this reason, as indicated in FIG. 6B by a broken line, the signal voltage $V_{sig}$ hardly changes.

As described above, the potential of the signal voltage $V_{sig}$ which largely changes between the ON state and OFF state of the touch sensor is detected at a timing of time T3 at which the sufficient potential change is expected. Specifically, at the time T3, as shown in FIG. 6E, the read signal (Read) is activated, thereby connecting the signal line 209 to the read circuit 2 shown in FIG. 4. A detecting circuit such as a sense amplifier is built in the read circuit 2, and detects whether or not the potential of the signal line 209 is larger than a reference potential. Also, the detecting circuit determines "sensor OFF" when the potential of the signal line 209 is larger than the reference potential, and determines "sensor ON" when the potential of the signal line 209 is smaller than the reference potential.

It should be noted that the reference potential may be changed to check the potential of the signal line 209 step by step, thereby detecting the contact state of the touch sensor in more detail. In addition, contact time or the like may be detected.

After that, the read signal (Read) is set in the OFF state (returned back to non-activation level), and the write signal (Write) is set in the ON state area (activated) to charge the signal line 209 with the electricity. At and after this time, the normal display can be carried out. After that, the common voltage $V_{com}$ is inverted, and the display control is continued.

Figure 7A:
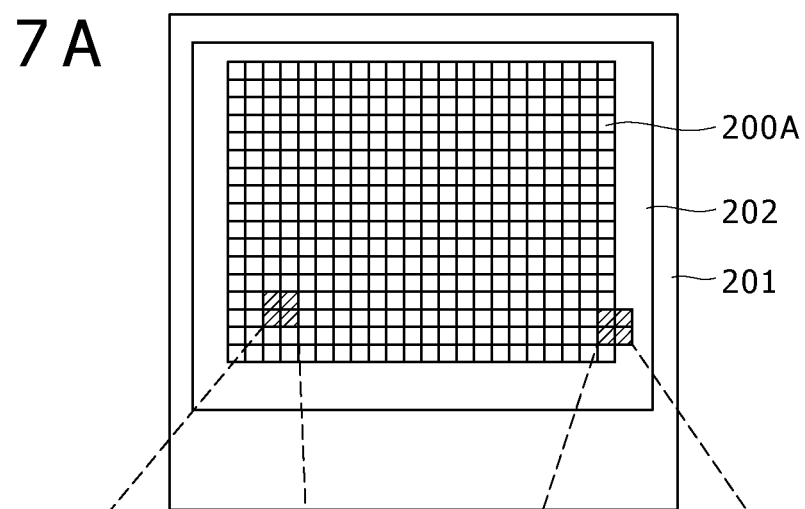
FIGS. 7A, 7B and 7C are respectively a top plan view showing a sensor electrode and its frame portion of an entire liquid crystal panel, and partially enlarged views of FIG. 7A.

FIG. 7A shows a transparent view (a transparent view when viewed from the display surface side) of the entire liquid crystal panel 200.

As shown in FIG. 7A, the liquid crystal panel 200 is formed by putting the color filter substrate 201 slightly larger than the TFT array substrate 202 on top of the TFT array substrate 202. The most area of the color filter substrate 201 forms the effective pixel area 200A to contribute to the image display.

Figure 7B:
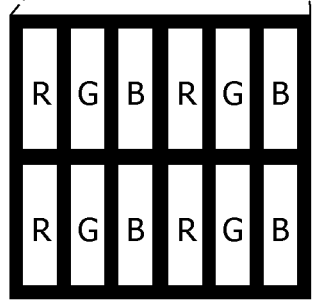
Figure 7C:
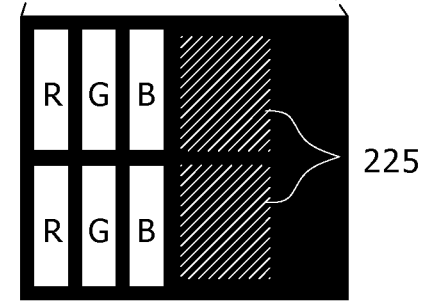

A predetermined color arrangement shown in FIG. 7B is made for the effective pixel area 200A. On the other hand, a peripheral pixel area which does not form the effective pixels because of its poor display characteristics, and a frame area as an area in which caps for enclosure of the liquid crystal are provided are formed in the peripheral four directions of the effective pixel area 200A. Although the frame area is a wasteful area in terms of the liquid crystal display device, the frame area is an essential area for formation in terms of the manufacture. As shown in FIG. 7C, sensor electrode frames 225 through which the sensor electrode (refer to FIGS. 1 and 2) are electrically connected to one another are formed in one frame shape in the frame area. The sensor electrode frames 225 have a function of unifying an electric potential distribution in the sensor electrodes 224 within the effective pixel area 200A because each of the sensor electrodes has a sufficiently larger width than that of each of the sensor electrodes 224, and thus has a low resistance.

Each of the sensor electrode frames 225 may be held at a given voltage such as the common voltage $V_{com}$, or may be in a floating state in terms of the electric potential. When the touch sensor is turned ON, the pixel electrode is electrically connected to the touch electrode. At this time, with regard to the capacitance in terms of the electrode, the capacitance of the touch electrode is predominantly larger than that of the pixel electrode, and thus a change in electric potential of the touch electrode can be disregarded. Therefore, even when the touch electrode is held at a given potential or is set in the floating state, the function is not changed so much in some cases.

In addition, when the change in electric potential is desired to be detected, the touch electrode may be set in the floating state after a predetermined potential with the common voltage $V_{com}$ as a reference is applied to the touch electrode.

A method of manufacturing such a liquid crystal panel 200 roughly includes the following four processes.

First step: the necessary functional films and interlayer films such as the color filter layer 220, the planarizing film 221, the common electrode 222, the first alignment film 223, and the sensor electrode 224 (first sensor electrode) are formed on the color filter substrate 201.

Second step: the necessary functional films and interlayer films such as the gate electrode 204, the gate insulating film 205, the TFT layer 206, the multi-layer insulating film 207, the plug 208, the signal line 209, the pixel electrode 210 (second sensor electrode), the height adjusting layer 211, and the second alignment film 212 are formed on the TFT array substrate 202.

Third step: the first substrate (the color filter substrate 201) after completion of the first step, and the second substrate (the TFT array substrate 202) after completion of the second step are stuck to each other through the spacer 230.

Fourth step: after the further necessary functional films, polarizing plate, etc., are fixed to the predetermined sides of the first substrate and the second substrate, the resulting liquid crystal panel 200 is fixed to the panel frame. Moreover, the backlight which is specially formed to the panel frame. In addition, a substrate having necessary components or parts mounted thereto is connected to the second substrate, and so forth, thereby completing the liquid crystal panel 200.

The method of manufacturing the liquid crystal display device of the first embodiment features the first step described above.

FIG. 8 is a flow chart of more detailed steps including the characteristic portion of the first step.

In Step ST1 of FIG. 8, the planarizing film 221 (or the color filter 220 when the planarizing film 221 is omitted) is formed.

In Step ST2, the first alignment film 223 is formed by applying a material such as "SE-7492 (product model number) made by Nissan Chemical Industries, Ltd.

In Step ST3, the first sensor electrode 224 (or the pixel electrode 210 when the second sensor electrode serves as the pixel electrode 210 as well) is formed on the first alignment film 223 by utilizing a technique such as screen printing.

When the rubbing is carried out before completion of Step ST3, the effect of the rubbing is largely reduced by carrying out Step ST3. Therefore, in the first embodiment, the rubbing is carried out in subsequent Step ST4. Even when the processes are carried out in the manner as described above, it is confirmed that the optical characteristics of the liquid crystal in the structure of the first embodiment are the same as those in the existing structure.

However, when the rubbing is carried out in the state in which the sensor electrode 224 is formed on the first alignment film 223, it is feared that the shaving chaff, on the rubbed surface, called "the buff chaff" accumulates in the sensor electrode edge, which may exert an influence on the characteristics, the yield and the reliability.

However, it is made clear that when the thickness of the sensor electrode is small, the reduction of the reliability due to the buff chaff is not caused. At this time, it is more preferable that the alignment with the rubbing direction of the sensor electrode 224 pattern is obtained, and so forth.

Preferably, as shown in FIG. 9B, the sensor electrodes 224 are formed in a rectangular or line-like shape approximately parallel with the rubbing direction. It should be noted that this result of study does not perfectly exclude the sensor electrode 224 pattern shown in FIG. 9A. Thus, it is possible that even when the pattern shape as shown in FIG. 9A is adopted, the reliability is not reduced as long as the sensor electrodes 224 are further thinned, or the sensor electrodes 224 are used in combination with a recess portion which will be described later.

Since in the first embodiment, the first sensor electrode 224 is formed on the first alignment film 223, there is no alignment film on the surface of the first sensor electrode 224, the touch sensor has the small contact resistance, and thus the high sensitivity is obtained. In addition, an error caused between the contact state and non-contact state of the sensor electrode is small. The provision of the height adjusting layer 211 results in that the contact detection at the high sensitivity and with the small error is more readily carried out and a contact pressure corresponding to the cell gap is obtained. Moreover, the second alignment film 212 on the TFT array substrate 202 side is readily prevented from being formed on the protrusion end face of the second sensor electrode 210.

The sensor electrodes 224 are preferably, electrically connected to one another through the sensor electrode frames 225 outside the effective pixel area because the uniform potential distribution is obtained.

In addition, in the manufacturing method, there is no addition of a special manufacturing method. Thus, the order of Steps is merely reversed, thereby making it possible to realize the structure in which the contact of the first alignment film with the touch sensor is not interrupted. In addition, it is more preferable that the better alignment between the rubbing direction and the pattern of the sensor electrodes 224 is obtained because the generation of the buff chaff is suppressed.

It is preferable that as in the case of the first embodiment, the pixel electrode 210 is used as the second sensor electrode as well because the aperture ratio (the rate at which the light transmitting area occupies the pixel area) can be made large.

As a result, an influence exerted on the optical characteristics is less. When the pixel electrodes are disposed on the array side and the common electrode is disposed on the counter side as in the case of VA, TN and ECB, the alignment film is formed after completion of the formation of the common electrode, and the sensor electrodes are then formed. At this time, the sensor electrodes are made the common electrode, which results in that even when the alignment film is not a perfect insulating film because there is pin holes in the alignment film or there is the damage during formation of the sensor electrodes, there is no influence exerted on the function (position detection) as the sensor electrode, or on the function (image quality) of the common electrode in terms of the display because the contacting electrode also became the common electrode. For this reason, although the process for forming the sensor electrode is added for the purpose of obtaining the touch panel function, an influence exerted on an increase in room for process choice, and in a phase of yield is less.

Now, in the case where the touch panel utilizing the resistance film system is externally mounted to the display panel, four-point current values which change in accordance with the contact within the effective detection area are read out outside the effective detection area of the touch panel, so that the contact position within the effective detection area is detected based on the change in resistance value. For this reason, the position detected based on the four-point current values thus read out is identified as one point.

On the other hand, in the first embodiment of the present invention, the function of the touch panel is built in the liquid crystal display device, and the contact electrode is electrically connected to the signal line, so that the change in potential due to the contact of the contact electrode with the sensor electrode is read out.

For this reason, which of the pixels the contact is caused in can be recognized, and thus there is an advantage that the position detection precision is higher in the touch panel in the first embodiment than in the touch panel utilizing the external resistance film system. In addition, since in the first embodiment, whether or not the contact is caused can be detected every pixel, two or more point-contact detection can be carried out. From this standpoint, it is difficult for the touch panel utilizing the above external resistance film system to carry out the detection for two or more portions.

In the first embodiment, when the display surface is more strongly pressed from the outside, for example, the contact over the wide area corresponding to 10 or more pixels is determined rather than the contact for about one pixel. That is to say, since in the first embodiment, the detection for each pixel is possible, the detection of the contact area, or the weight recognition corresponding to the pressing pressure becomes possible. From the same reason, even in the case where an area receiving the external pressure applied thereto has a shape such as the case where a Braille pattern is pressed against the display surface, the shape can be recognized.

As has been described, according to the first embodiment of the present invention, not only the high detection sensitivity can be obtained, but also the multi-point recognition, the shape recognition, the weight recognition, and the like become possible all the more because the resolution can be obtained in the smallest pixels. Therefore, it is possible to provide the liquid crystal display device having the high performance different from the external touch panel.

Second Embodiment

FIG. 10 is a schematic cross sectional view showing a structure of a liquid crystal display device having an FFS mode according to a second embodiment of the present invention.

The second embodiment is largely different from the first embodiment in that the common electrode 222 is not formed on the color filter layer 220 side, but is formed on the color filter substrate 201 side, and the pixel electrode 210 is obtained by carrying out the patterning into a strip shape so as for the operation of the electric field from the common electrode 222 to act on the liquid crystal layer 203.

Other respects in structure are the same as those in the case of the first embodiment, and the feature that the sensor electrode 224 is formed on the first alignment film 223 is common to the first embodiment.

Accordingly, the same effects as those of the first embodiment can be obtained in the second embodiment.

Change 1

When the sensor electrode 224 formed on the first alignment film 223 is disposed in an opening portion, the reduction of the image quality is observed because the liquid crystal does not align in the proper way. Therefore, the sensor electrode 224 is preferably disposed in a non-opening portion. Alternatively, the sensor electrode 224 may also be disposed so as to be hidden by the scanning line and the signal line 209 which are provided as the light blocking portion on the array substrate side.

However, since the sensor electrode 224 is provided on the counter substrate (the color filter substrate 201) side, when the aperture ratio is taken into consideration, the sensor electrode 224 is preferably hidden by the black matrix on the color filter substrate 201 side not requiring the cell alignment margin. Then, since the sensor electrode 224 does not contribute to the optical characteristics, when the sensor electrode 224 is made of a metallic material such as molybdenum (Mo) or aluminum (Al) or a chromium oxide, a conductive black resist or the like which is used in the black matrix, the sensor electrode 224 can serve as light blocking layer as well. In this connection, there is offered an effect that the process can be simplified, and there is an advantage that the high aperture ratio can be realized because there is no need for addition of the alignment precision.

Change 2

The pixel electrode 210 (the second sensor electrode when the second sensor electrode does not serve as the pixel electrode 210 as well) and the sensor electrode 224 are never touched when there is no external pressure. For this reason, the height, of the protrusion end face of the pixel electrode 210, regulated based on the height of the height adjusting layer 211 described above normally becomes equal to or smaller than the cell gap (the thickness of the liquid crystal layer 203 in a phase of a steady state (when the external pressure is zero)). That is to say, in the case where the cell gap is shallow or the like, "an eye hole" of the second alignment film 212 described above is not stabilized in some cases. Here, the word "the eye hole" means that when the processes of the application of the alignment film, and the rubbing are carried out in the phase of formation of the second alignment film 212, the second alignment film 212 is not formed on the protrusion end face of the pixel electrode 210 or is merely formed so thinly as not to exert an influence on the contact due to the presence of the height adjusting layer 211.

In order to cope with such a situation, as shown in FIG. 11, the sensor electrode 224 on the color filter substrate 201 side is formed in a depression, whereby the height of the protrusion end face of the pixel electrode 210 (or the second sensor electrode) can stably fall within the height range in which "the eye hole" of the alignment film is stably generated.

With regard to a technique for forming a recess portion on the color filter substrate 201 side, the best control is obtained in the case of a method in which the planarizing film 221 is made of a positive resist, and the depression is adjusted with an exposure amount. In addition, a non-filter area 220B of the color filter layer 220 is removed to form a stepped portion, thereby making it also possible to adjust the depth of the recess portion. For this case, there is no need for specially forming a mask, or there is no need for specially adding a process. As a result, there is an advantage that the depression can be readily formed. The process for removing the non-filter area 220B may be used together with the process for forming the depression in the planarizing film 221.

Change 3

The pattern of the first sensor electrode 224 is not necessarily formed in the rectangular shape or line-like shape approximately parallel with the rubbing direction. When the number of pattern components extending lengthwise in the rubbing direction is larger than the number of other pattern components extending in other directions, there is obtained an effect corresponding to a difference between them.

That is to say, in the case where there are given an x vector and a y vector perpendicularly intersecting with each other, when the rubbing direction is the y direction, the sensor electrodes are disposed in parallel with the y vector. When the pattern of the sensor electrodes 224 contains therein a pattern component parallel with the x vector due to the relation of the resistance value or the like, and the dog-leg shape of the pixel, the sensor electrodes are disposed so that the number of pattern components concerned is reduced as few as possible. That is to say, the directional vectors of the sensor electrodes other than the rubbing direction can be expressed by (aX+AY, bX+BY, cX+CY, . . . ) by using a directional vector of the rubbing. Also, the directional vectors obtained by multiplying the directional vectors of the sensor electrodes by lengths $\alpha$, $\beta$, $\gamma$, . . . of the individual sensor electrodes show a relationship of $(\alpha a+\beta b+\gamma c+ \ldots )<(\alpha A+\beta B+\gamma C+ \ldots )$.

For example, even when the sensor electrodes each having the direction vertical to the rubbing direction are required, the sensor electrodes are disposed in such a way that the number of sensor electrodes each parallel with the rubbing direction is increased, and the number of sensor electrode components each vertical to the rubbing direction is reduced, thereby obtaining the highly reliable liquid crystal display device.

Even when the rubbing direction is suitably set in the manner as described above, the buff chaff is accumulated in the most peripheral portion of the panel. When there are some of the sensor electrodes disposed outside the effective pixels, there is no influence of the accumulation of the buff chaff. Thus, there is formed a structure in which the pattern end is formed in a portion located away from the effective pixels, or a slit is formed finer than the effective pixel, thereby trapping the buff chaff in the periphery. In such a manner, the structure in which the pattern is cut in and after the effective end and thus the buff chaff is accumulated in the portions other than the effective pixels is formed, thereby improving the yield.

Change 4

It is preferable that the pixel electrode 210 is used as the second sensor electrode as well as with the first and second embodiments because the aperture ratio (the rate at which the light transmitting area occupies the pixel area) can be made large.

Figure 12:
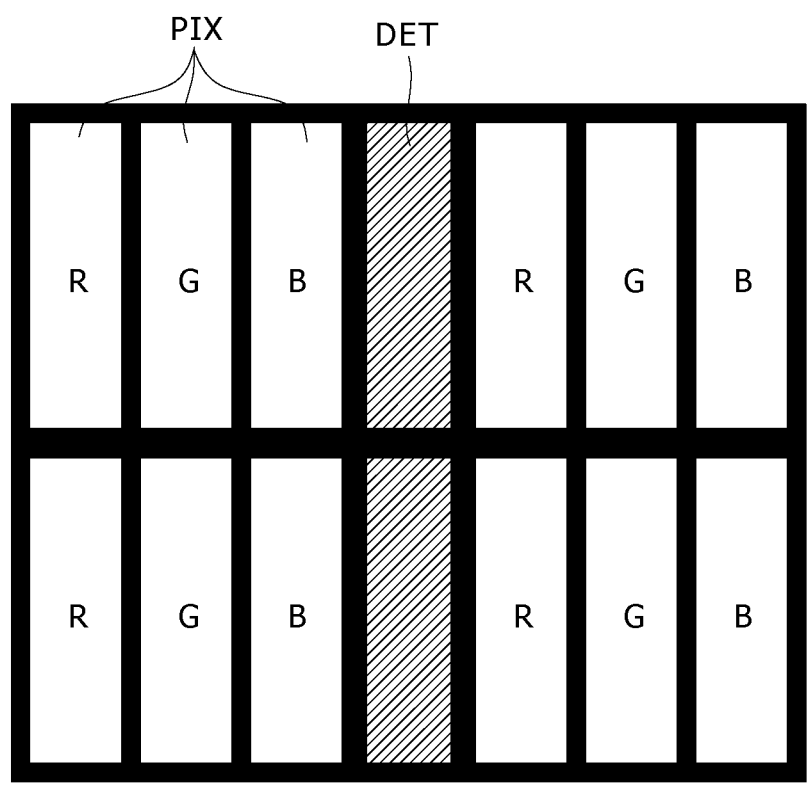
FIG. 12 is a top plan view showing a structure of a transmission type liquid crystal display device according to Change 4, and explaining a layout of four pixel units and two detection areas.

However, as shown in FIG. 12 (corresponding to FIG. 7B), different pixels each having only a sensor (indicated by slant lines, and hereinafter referred to as "a detection area DET" as well because each of them does not actually function as the pixel) may also be provided at a predetermined arrangement and rate with respect to the pixels R, G and B. In this case, the signal line 209 and the scanning line (gate electrode line) are suitably connected to the pixel (detection area DET) having only the sensor. When the second sensor electrode is not used as the pixel electrode 210 as well in such a manner, it is unnecessary to make the second sensor electrode of the transparent electrode material. Therefore, it is better to make the second sensor electrode of a conductor (such as a conductive organic material or a metal). As a result, the second sensor electrode can act as a light blocking strip. The light blocking strip can be utilized as an alternative of a reflecting electrode for each pixel in a semi-transmission type liquid crystal display device. In this case, suppression of generation of the useless area, and reduction of the process become possible. When the transistors of the peripheral pixels are intensively disposed in an area on which the light blocking strip casts a shadow, it is possible to reduce an optical leakage current of a TFT film.

Change 5

In Change 4 described above, since the pixel electrode 210 is not used as the second sensor electrode as well, the pixel PIX and the detection area DET are formed separately from each other on the area.

On the other hand, in Change 5, a description will be given with respect to a pixel pattern example in the case where although the pixel PIX is given the function of the contact detection, the pixel electrode 210 is not used as the second sensor electrode as well.

Figure 13:
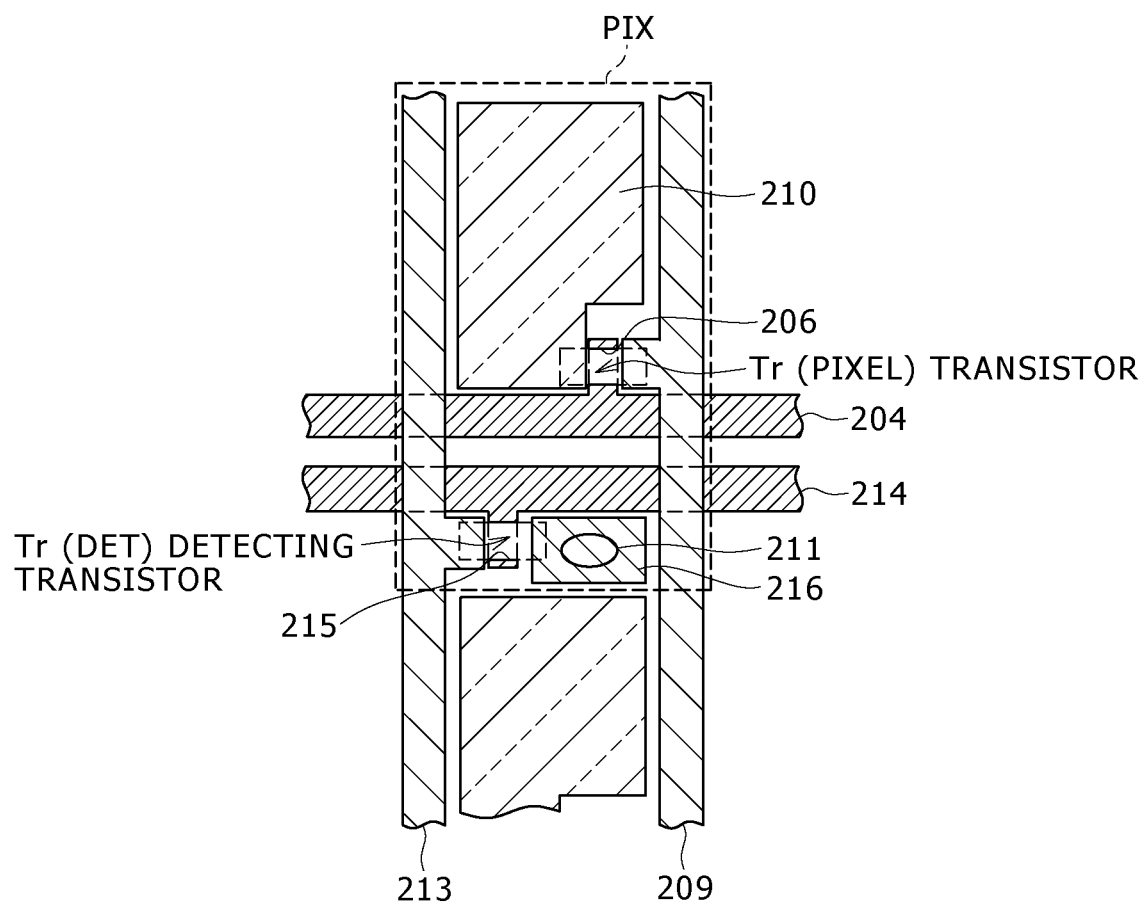
FIG. 13 is a top plan view showing a structure of a pixel in a transmission type liquid crystal display device according to Change 5.

FIG. 13 is a top plan view of a pixel according to Change 5.

It is identical to the pixel illustrated in FIG. 3 that a pixel PIX according to Change 5 illustrated in FIG. 13 has the gate electrode 204, the signal line 209, the pixel electrode 210, and the transistor Tr formed in a portion in which the gate electrode 204 intersects with the TFT layer.

A detection line 213, a detection gate line 214, a TFT layer 215 of a detecting transistor Tr (DET), and a second sensor electrode 216 are added as new constituent elements to the pixel PIX illustrated in FIG. 13.

The detection gate line 214 is made of a high-melting point metal such as molybdenum similarly to the case of the gate electrode 204, and is wired in parallel with the gate electrode 204.

The TFT layer 215 is made of the same material as that of the TFT layer 206 of the transistor Tr concurrently with the formation of the TFT layer 206. An impurity is introduced to the TFT layer 206, thereby forming a source region and a drain region. The detecting transistor Tr (DET) is formed in an intersection portion between the TFT layer 215 and the detection gate line 214. One of the source terminal and the drain terminal of the detecting transistor Tr (DET) is connected to the detection line 213 wired in parallel with the signal line 209. In addition, the other of the source terminal and the drain terminal of the detecting transistor Tr (DET) is connected to the second sensor electrode 216. The second sensor electrode 216 is formed separately from the pixel electrode 210 made of the transparent electrode material. Therefore, the second sensor electrode 216 can be made of the same material as that each of the signal line 209 and the detection line 213 concurrently with formation of the signal line 209 and the detection line 213. The second sensor electrode 216 partially overlaps the height adjusting layer 211 previously formed in a base of the second sensor electrode 216. For this reason, the second sensor electrode 216 portion higher in position than the height adjusting layer 211 can contact the first sensor electrode 224. It should be noted that although not illustrated in FIG. 13, the sensor electrode 224 may be disposed in parallel with the detection gate line 214 similarly to the case of the first embodiment shown in FIG. 3.

Figure 14:
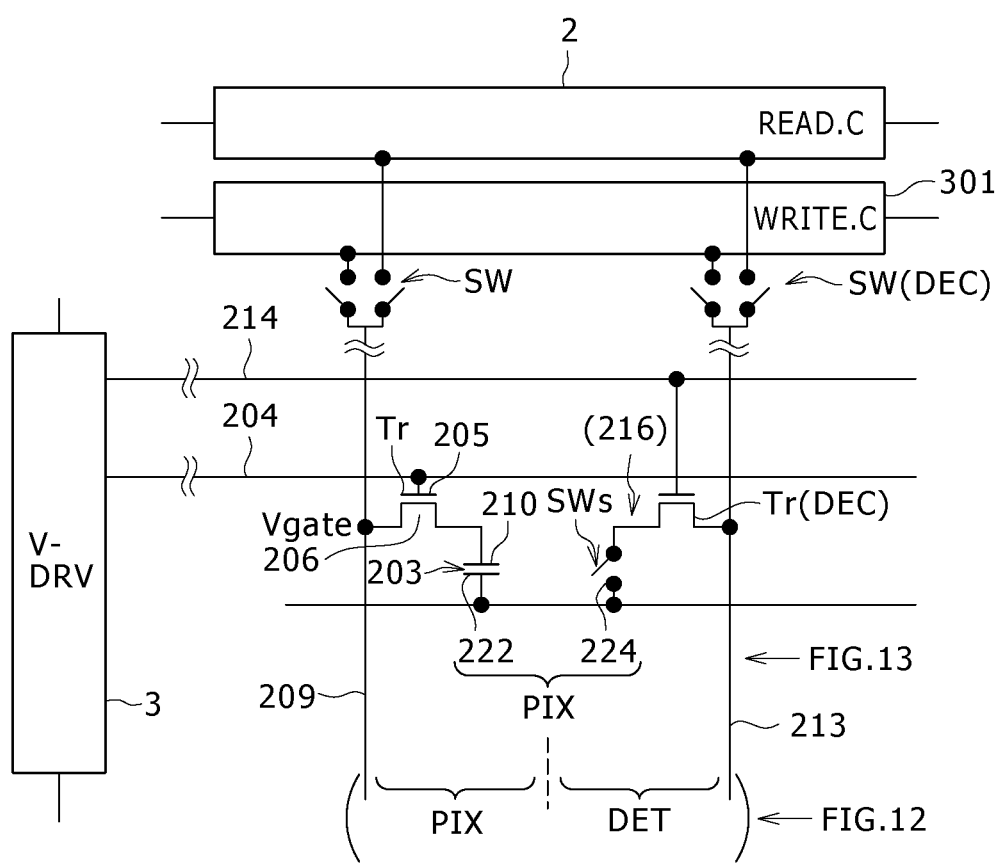
FIG. 14 is a circuit diagram, partly in block, showing an equivalent of the pixel, and a part of a peripheral circuit thereof in Change 4 or 5.

FIG. 14 shows an equivalent circuit of the pixel PIX in the case where the pixel electrode 210 is not used as the second sensor electrode as well.

One of the source terminal and the drain terminal of the transistor Tr is connected to the pixel electrode 210, and the other of the source terminal and the drain terminal thereof is connected to the signal line 209.

The gate terminal of the transistor Tr is connected to the gate electrode 204. A gate voltage $V_{gate}$ is supplied from a vertical drive circuit (V-DRV) 3 to the gate terminal of the transistor Tr through the gate electrode 204. The transistor Tr is controlled in accordance with the potential of the gate voltage $V_{gate}$.

Each of the common electrode 222 and the sensor electrode 224 is connected to the supply line ($V_{com}$ wiring) for the common voltage $V_{com}$.

The signal line 209 is connected to the read circuit 2 and the write circuit 301 through the read side and the write side of the switch SW, respectively.

Although the configuration and operation described above are the same as those of the first embodiment shown in FIG. 4, in the case of Change 5 shown in FIG. 14, a detection gate line 214 is provided as a control line which the vertical drive circuit (V-DRV) 3 drives. The detection gate line 214 is connected to the gate terminal of the detecting transistor Tr (DET). In addition, a read side and a write side of a switch SW (DET) different from the switch SW are connected to the read circuit 2 and the write circuit 301, respectively. The detection switch SW (DET) carries out differentially connection of the write circuit 301 to the detection line 213 in the phase of the write operation, and connection of the read circuit 2 to the detection line 213 in the phase of the read operation (this means that "the read side and the write side of the switch SW (DET) are not simultaneously turned ON").

The operation of the pixel PIX configured in the manner as shown in FIG. 14 is approximately equal to that of the pixel PIX previously described with reference to the waveform charts shown in FIGS. 6A to 6E. However, the write signal (Write) shown in FIG. 6D, and the read signal (Read) shown in FIG. 6E are signals in accordance with which the write side and the read side of the detecting switch SW (DET) shown in FIG. 14 are controlled, respectively. On the other hand, when the reading operation for reading out the signal for the position detection from the signal line 209 is not carried out, the switch SW shown in FIG. 14 may be omitted, and thus the signal line 209 may be directly connected to the write circuit 301.

In addition, FIG. 14 may be thought as the equivalent circuit of the pixel in Change 4. In this case, FIG. 14 shows the equivalent circuit of the pixel PIX (the pixel for B display) and the detection area DET adjacent to each other in corresponding to FIG. 12.

Change 6

Figure 15B:
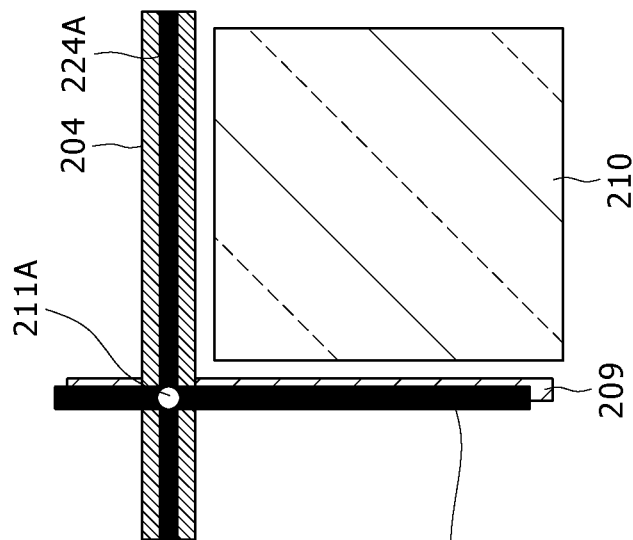
FIGS. 15A and 15B are respectively a perspective view and a top plan view each showing a structure of a sensor electrode in Change 6.
Figure 15A:
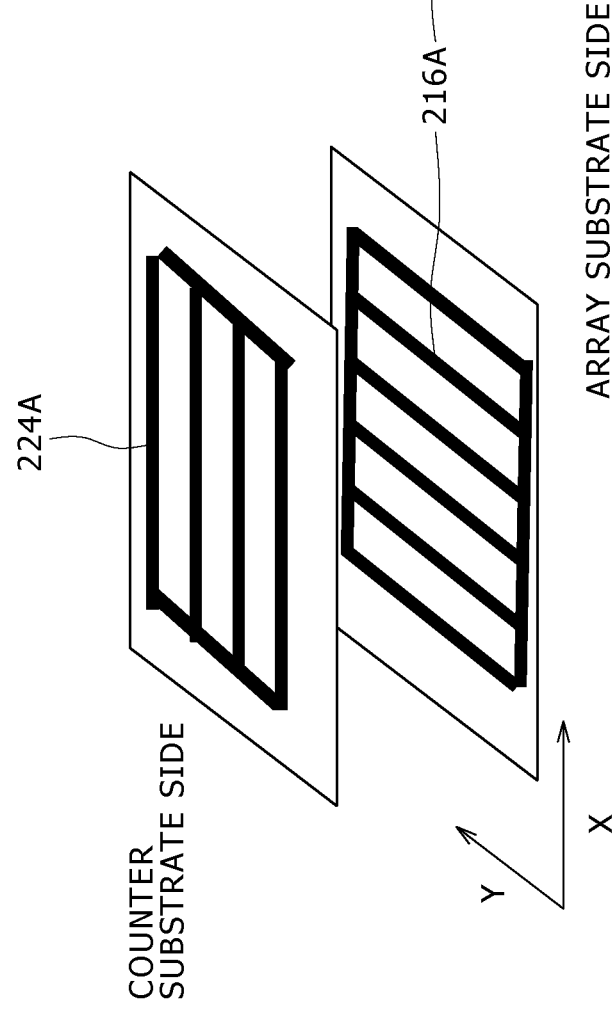

FIGS. 15A and 15B show structural views of a sensor electrode in Change 6.

When not being used as the pixel electrode as well, the second sensor electrode 216A on the array substrate side is not formed as the isolated pattern every pixel as in the case of Change 5, but can be formed in parallel lines as shown in FIG. 15A. In this case, the first sensor electrodes 224A on the counter substrate side are formed in parallel lines in a direction perpendicularly intersecting with second sensor electrodes 216A formed in parallel lines.

Pitches of the second sensor electrodes 216A and the first sensor electrodes 224A, as shown in FIG. 15B, are preferably such narrow pitches as to form an intersection point every pixel.

How to detect the touch is as follows.

A voltage is applied to each of the first sensor electrodes 224A in the parallel line direction, thereby detecting potential of each of the second sensor electrodes 216A. When the contact is caused in a certain point, a voltage division of a line resistance corresponding to the contact position is caused in the first sensor electrode 224A, and a value of the voltage division determines the potential of each of the second sensor electrodes 216A. Therefore, an X coordinate of the contact position can be detected based on the potential of the second sensor electrodes 216A.

Likewise, a voltage is applied to each of the second sensor electrodes 216A in the parallel line direction, thereby detecting the potential of each of the first sensor electrode 224A. When the contact is caused in a certain point, a voltage division of a line resistance corresponding to the contact position is caused in the second sensor electrode 216A, and a value of the voltage division determines the potential of each of the first sensor electrodes 224A. Therefore, a Y coordinate of the contact position can be detected based on the potential of each of the first sensor electrodes 224A.

In FIGS. 15A and 15B, the parallel line portions of the first sensor electrodes 224A, and the parallel line portions of the second sensor electrodes 216A are connected to the respective outer frames, thereby obtaining the same potentials, respectively.

The parallel line portions of the parallel line portions of the first sensor electrodes 224A, and the parallel line portions of the second sensor electrodes 216A may be separated from one another, respectively, by removing the respective outer frames. In this case, which of the parallel lines contact each other may be electrically detected.

It is preferable that the parallel line portions of the first sensor electrodes 224A, and the parallel line portions of the second sensor electrodes 216A, as shown in FIG. 15B, are disposed in the light blocking area, overlapping the gate electrode 204 and the signal line 209, in the peripheries of the pixel electrodes 210 because the utilization efficiency of the light is prevented from being impaired.

Change 7

The first and second embodiments and Changes 1 to 6 can be each carried out based on two or more arbitrary combinations.

Change 7 is a change which can be further multiply applied to one of the first and second embodiments, a combination of one of the first and second embodiments with any of Changes 1 to 6, or two or more arbitrary combinations of the first and second embodiments, and Changes 1 to 6.

In Change 7, the case where the simplest first embodiment is combined solely with Change 7 is exemplified.

Figure 16:
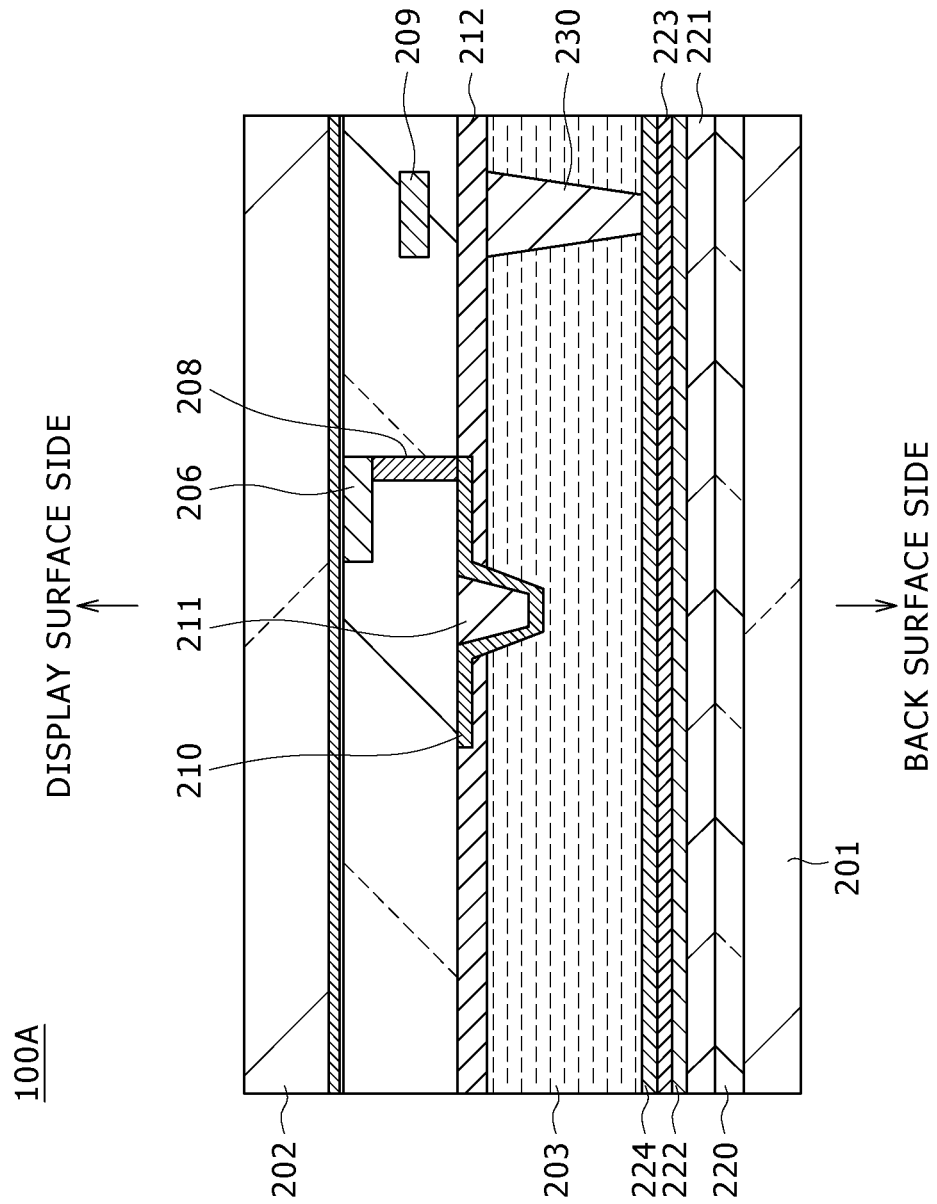
FIG. 16 is a cross sectional view showing a structure of a transmission type liquid crystal display device according to Change 7.

FIG. 16 is a cross sectional view showing a structure of a liquid crystal display device according to Change 7.

The same portions in FIG. 16 as those in the first embodiment shown in FIG. 1 are designated by the same reference numerals, respectively. In comparison with FIG. 1, in the structure shown in FIG. 16, the front surface and the back surface are reversed because the color filter substrate 201 is located on the back surface side (backlight side), and the TFT array substrate 202 is located on the display surface side. Since the user touches the display surface side with his/her finger or the like, the TFT array substrate 202 is bent by application of the external face, so that the pixel electrode 210 formed on the TFT array substrate 202 side approaches and contacts the sensor electrode 224 formed on the color filter substrate 201 side.

Although it is not preferable that a stress is applied to the TFT layer, since when the cell gap (the thickness of the liquid crystal layer 203) is small, the stress is small accordingly, the contact detection can be carried out with such a reversed structure.

Change 8

Although the first and second embodiments, and Changes 1 to 7 are each made on the assumption that the read circuit detects the contact between the first sensor electrode and the second sensor electrode, a change in capacitance not resulting from the contact, but resulting from the approach may be detected.

Therefore, in the present invention, the read circuit reads the electrical change between "the first sensor electrode and the second sensor electrode (the pixel electrode when the second sensor electrode is not used as the pixel electrode as well)."

The present application contains subject matter related to that disclosed in Japanese Priority Patent Application JP 2008-204593 filed in the Japan Patent Office on Aug. 7, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display device, comprising:
    a plurality of pixels disposed in a matrix, each pixel having a pixel area including (i) an effective pixel area for an image display, and (ii) a peripheral pixel area surrounding said effective pixel area;
    a first substrate on a display surface side;
    a second substrate on a back surface side;
    a liquid crystal layer between said first and second substrates;
    a first alignment film carried on a side of said first substrate proximate to said liquid crystal layer;
    a first sensor electrode (i) carried on said first alignment film in a light blocking area where a transistor is disposed, and (ii) having a pattern of rectangles elongated in one direction at least within said effective pixel area;
    a height adjusting protrusion (i) carried on a side of said second substrate proximate to said liquid crystal layer, (ii) extending into said liquid crystal layer, and (iii) extending toward said first sensor electrode in said light blocking area;
    a pixel electrode carried on said second substrate and covering an entirety of said pixel area of each of said plurality of pixels, a first part of said pixel electrode (i) formed on said height adjusting protrusion, (ii) configured as a second sensor electrode, and (iii) operable to approach or contact said first sensor electrode when said first substrate is pressed toward said second substrate;
    a second alignment film (i) carried on said second substrate, (ii) formed on a second part of said pixel electrode surrounding said height adjusting protrusion, (iii) not formed on said first part of said pixel electrode on said height adjusting protrusion, and (iv) having a variable thickness; and
    a circuit (i) configured to read an electrical change between said first sensor electrode and said first part of said pixel electrode configured as said second sensor electrode, and (ii) electrically connected with a signal line, said signal line disposed along pixel columns in said matrix of said plurality of pixels to permit touch detection for each of said plurality of pixels.

2. The liquid crystal display device according to claim 1, wherein:
    a common electrode is carried on said first substrate, said common electrode is common to said plurality of pixels, and
    said first sensor electrode is electrically connected to said common electrode.

3. The liquid crystal display device according to claim 1, wherein said height adjusting protrusion is made of a light blocking material.

4. The liquid crystal display device according to claim 1, wherein:
    said first substrate has a recess portion in a part of a surface on which said first alignment film is formed,
    said first alignment film is continuous between an inside and an outside of said recess portion, and
    said first sensor electrode is positioned within said recess portion.

5. The liquid crystal display device according to claim 4, wherein:
    a color filter layer is disposed between said first substrate and said first alignment film in a light transmitting area; and
    said recess portion (i) is formed in said light blocking area, and (ii) has a shape corresponding to an edge of said color filter adjacent to said light blocking area.

6. The liquid crystal display device according to claim 1, wherein said one direction of said pattern of rectangles is a rubbing direction of said first alignment film.

7. The liquid crystal display device according to claim 6, wherein each of said rectangles in said pattern of rectangles are electrically connected to one another outside of said effective pixel area.

8. The liquid crystal display device according to claim 1, wherein:
    (a) said pixel electrode includes a plurality of pixel electrodes disposed in said matrix, said plurality of pixel electrodes configured to locally apply different electric fields to said liquid crystal layer;
    (b) said signal line includes a plurality of signal lines within a wiring group, said wiring group configured for matrix-driving applied voltages corresponding to respective pixels;
    (c) said transistor configured to control a connection between said signal lines within said wiring group; and
    (d) said plurality of pixel electrodes are disposed on said second substrate, thereby partitioning a planar surface when viewed from said display surface by said plurality of pixels.

9. The liquid crystal display device according to claim 1, wherein:
    second sensor electrode has a pattern of rectangles elongated in another direction and perpendicularly intersecting with said one direction at least within said effective pixel area;
    a change in potential of said second sensor electrode is detected when a voltage is applied to said first sensor electrode in a longitudinal direction of the rectangular or line-like shape;
    a change in potential of said first sensor electrode is detected when a voltage is applied to said second sensor electrode in a longitudinal direction of the rectangular or line-like shape; and
    a portion in which said first sensor electrode and said sensor electrode either contact or approach each other is detected based on potential changes in the two detection results.

10. The liquid crystal display device of claim 1, wherein:
said second alignment film is at least partially formed directly on said second sensor electrode, and
said second sensor electrode is at least partially embedded in said second alignment film.

11. The liquid crystal display device of claim 1, wherein, the height adjusting portion (i) has an oval shape when viewed from the display surface side, and (ii) is formed as an isolated pattern.

12. A method of manufacturing a liquid crystal display device, comprising:
disposing a plurality of pixels disposed in a matrix, each pixel having a pixel area including (i) an effective pixel area for an image display, and (ii) a peripheral pixel area surrounding said effective pixel area;
disposing a first substrate on a display surface side;
disposing a second substrate on a back surface side;
injecting a liquid crystal layer between said first substrate and second substrates;
forming a first alignment film on a side of said first substrate proximate to said liquid crystal layer;
forming a first sensor electrode (i) carried on said first alignment film in a light blocking area where a transistor is disposed, and (ii) having a pattern of rectangles elongated in one direction at least within said effective pixel area;
forming a height adjusting protrusion (i) carried on a side of said second substrate proximate to said liquid crystal layer, (ii) extending into said liquid crystal layer, and (iii) extending toward said first sensor electrode is said light blocking area;
forming a pixel electrode carried on said second substrate and covering an entirety of said pixel area of each of said plurality of pixels, a first part of said pixel electrode (i) formed on said height adjusting protrusion, (ii) configured as a second sensor electrode, and (iii) operable to approach or contact said first sensor electrode when said first substrate is pressed toward said second substrate;
forming a second alignment film (i) carried on said second substrate, (ii) formed on a second part of said pixel electrode surrounding said height adjusting protrusion, (ii) not formed on said first part of said pixel electrode on said height adjusting protrusion, and (iv) having a variable thickness; and
disposing a circuit (i) configured to read an electrical change between said first sensor electrode and said first part of said pixel electrode configured as said second sensor electrode, and (ii) electrically connected with a signal line, said signal line disposed along pixel columns in said matrix of said plurality of pixels to permit touch detection for each of said plurality of pixels.

13. The method of manufacturing a liquid crystal display device according to claim 12, wherein,
said alignment film has a rubbing direction, and
said one direction of said pattern of rectangles of said first sensor electrode extends lengthwise in said rubbing direction at least within said effective pixel area.

\* \* \* \* \*